Patented Mar. 15, 1927.

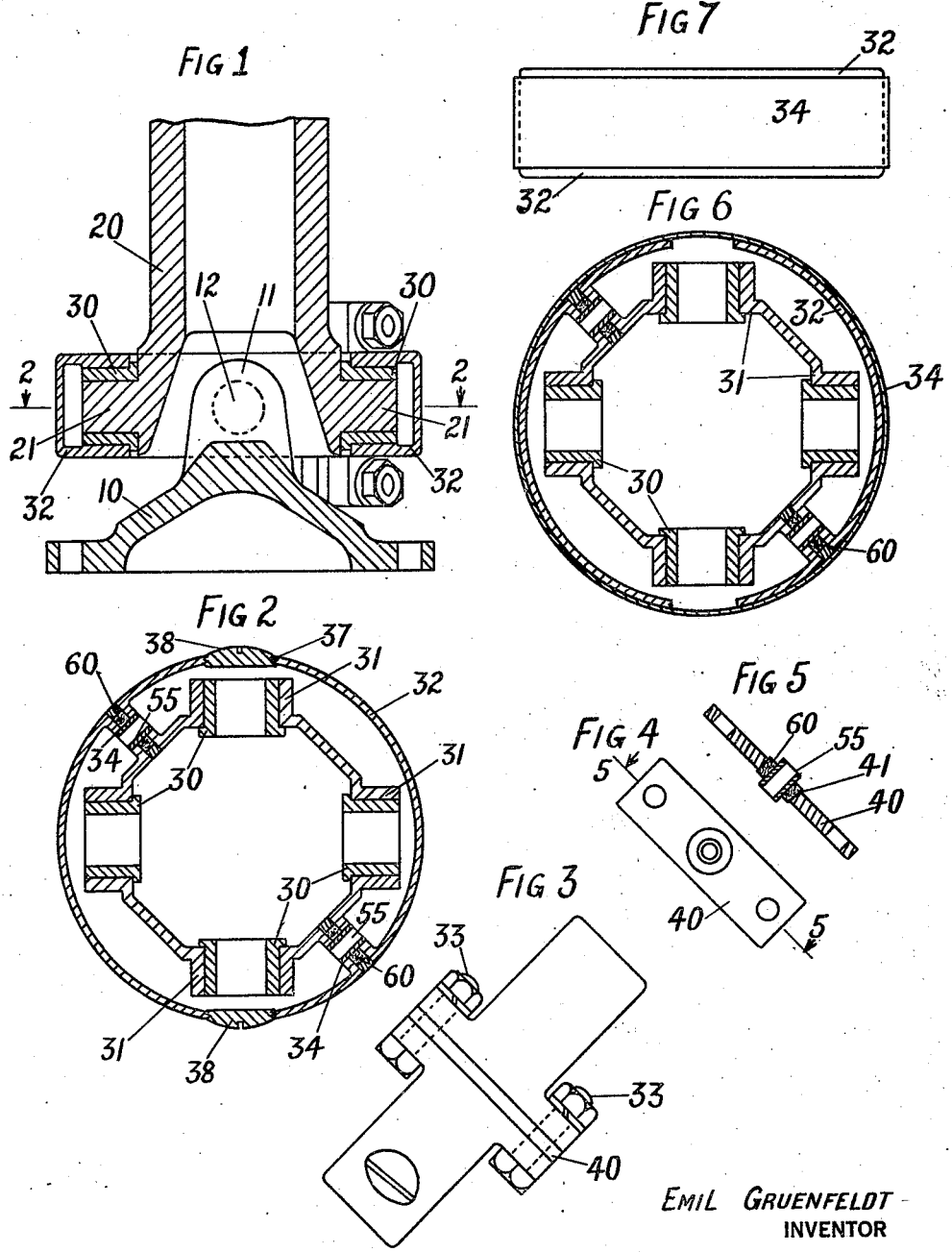

1,621,247

UNITED STATES PATENT OFFICE.

EMIL GRUENFELDT, OF CLEVELAND, OHIO.

UNIVERSAL JOINT.

Application filed November 28, 1925. Serial No. 71,956.

This invention relates to universal joints, and more particularly to joints of the character wherein the trunnions on the end coupling members are connected with an intermediate hollow lubricant-containing ring through journal bearings mounted radially in said ring.

It is the general purpose and object of this invention to provide a joint of the general character referred to wherein the lubricant containing ring is made of two semicircular parts suitably connected each part being provided with a seat for a bushing providing a bearing for one of the two trunnions of the driving member and a seat for a bushing providing a bearing for one of the two trunnions of the driven member.

A further object of the invention is to provide a construction which will enable the joint to be assembled quickly and conveniently; and a still further object of the invention is to provide a joint capable of realizing all of the foregoing objects in a construction which is economical of production.

The foregoing and other features of my invention will now be described in connection with the accompanying drawings forming part of this specification in which I have represented my universal joint in its preferred form, after which I shall point out more particularly in the claims those features which I believe to be new and of my own invention.

In the drawings:

Figure 1 is a longitudinal section of my universal joint.

Figure 2 is a section along the line 2—2 Figure 1 with the coupling members removed.

Figure 3 is a projected side view of the lubricant containing ring shown in Figure 2.

Figure 4 is a plan of the spacer employed.

Figure 5 is a section along the line 5—5 Figure 4.

Figures 6 and 7 are views similar to those shown in Figures 2 and 3 respectively, but of a modification employed.

In the carrying out of my invention I employ a driving member 10 and a driven member 20 each provided with two trunnions or journals adapted to be received by bushings 30 mounted in seats 31 provided in connecting ring 32.

I have illustrated the driven member 20 as being provided with two integral trunnions 21 while the driving member 10 is provided with projection 11 adapted to operate between the bases of the trunnions 21, said projection being provided with a hole 12 adapted to receive a pin, with a driving fit, the ends of which serve as the driving trunnion. As this is common to ring type construction no further description is thought to be necessary, as the invention lies solely in the features embodied in the connecting ring.

The ring 32 is made up of two semicircular hollow parts. They may be held together by means of bolts 33 as shown in Figure 3 or they may be held together by a ring 34 completely surrounding the two semicircular parts as shown in Figures 6 and 7.

In between the semicircular pieces I provide spacers 40, having a central hole 41 considerably larger than the dowel holes 34 in the semicircular pieces. The dowel holes 34 are provided to accommodate the hollow dowels 55. The object of the hollow dowels is to provide a means for aligning the semicircular pieces and to provide a means to allow the lubricant to pass from one hollow piece to another. Surrounding the hollow dowels 55 I provide a packing washer 60 which is thicker than the spacer 40 and is compressed during assembly, assuring a tight joint which prevents loss of lubricant from the semicircular pieces.

For the purpose of machining and for convenience in assembly I provide two openings 37 in the ring member directly in line with the bushing seats 31 and I propose to close these openings with a plug 38 when the semicircular halves are bolted together as shown in Figures 2 and 3. But when the halves are held together by the ring 34 which is driven over the periphery of the semicircular pieces it may not be necessary to provide these plugs 38.

In assembling my device four bushings 30 are driven into place in the seats 31 provided for the purpose in two of the semicircular pieces. Two semicircular pieces are then placed together in position with the fixed trunnions of the driven member in opposing bushings, care being had that the bushings not opposite the holes 37 are used. The object of these holes 37 is to provide a means for inserting a pin forming the trunnions for the driving member. The halves are then drawn together by the bolts 33 or they may be otherwise compressed and the ring 34 driven over the periphery of the semi-circular pieces. If the outer ring 34 is provided without a hole corresponding to hole 37 for the insertion of the loose pin, the pin must be inserted before the compression ring is put in place.

The journal pin of the driving member is then put through the opening 37 and driven through the opening 11 until it is in its proper position forming the journals of the driving member.

It will be observed that the driving ring is in two semicircular parts, and each part comprises a journal bearing for both the driving and driven members, none of the journals being located in the split part of the torque ring, that when assembled the lubricant containing chambers are connected so that the lubricant can flow around during the operation of the joint and freely feed the journal bearings.

I wish it distinctly understood that my universal joint herein described and illustrated is in the form in which I desire to construct it, but that changes or variations may be made as may be convenient or desirable without departing from the salient features of my invention and I, therefore, intend the following claims to cover such modifications as naturally fall within the lines of invention.

I claim:

1. In a universal joint, the combination, with a driving and a driven member and trunnions carried thereby, of a hollow lubricant containing connecting ring for said trunnions, the said ring comprising two complemental parts adapted to be secured together each part containing a complete bearing for one of the trunnions of both the driven and driving member.

2. In a universal joint, the combination, with a driving and a driven member and trunnions carried thereby, of a hollow lubricant containing connecting ring for said trunnions, the said ring comprising two semicircular parts, secured together, each part carrying two complete bearings, one of which is adapted to receive one of the trunnions of the driving member, the other bearing adapted to receive one of the trunnions of the driven member.

3. The device of claim 1 in which the two complemental parts are held in alignment by hollow dowels through which the lubricant chambers are connected with each other.

4. The device of claim 2 including means for connecting the semi-circular lubricant chambers together.

5. The device of claim 2 including spacers interposed between the ends of the semi-circular members provided with recesses containing compressible packing.

6. In a universal joint, the combination, with a driving and a driven member and trunnions carried thereby, of a hollow lubricant-containing ring for said trunnions, the said ring comprising two semi-circular parts each part containing two complete bearings, one for one of the trunnions of the driving member, and the other for one of the trunnions of the driven member; a clamping ring surrounding the semi-circular parts to hold the parts rigidly assembled.

7. A universal joint comprising a driving and a driven member each having trunnions, a connecting ring comprising two parts of semi-circular sections, each of said sections containing complete bearings for one of the trunnions carried by both the driving and driven members.

In testimony whereof I affix my signature.

EMIL GRUENFELDT.